May 15, 1928.

D. Q. WILKES 1,669,584

BRAKE TESTING DEVICE FOR AUTOMOBILES

Filed Nov. 6, 1926

May 15, 1928.  
D. Q. WILKES  
1,669,584  
BRAKE TESTING DEVICE FOR AUTOMOBILES  
Filed Nov. 6, 1926  
3 Sheets-Sheet 2

Inventor  
Don Q. Wilkes  
By H. S. Bailey, Attorney.

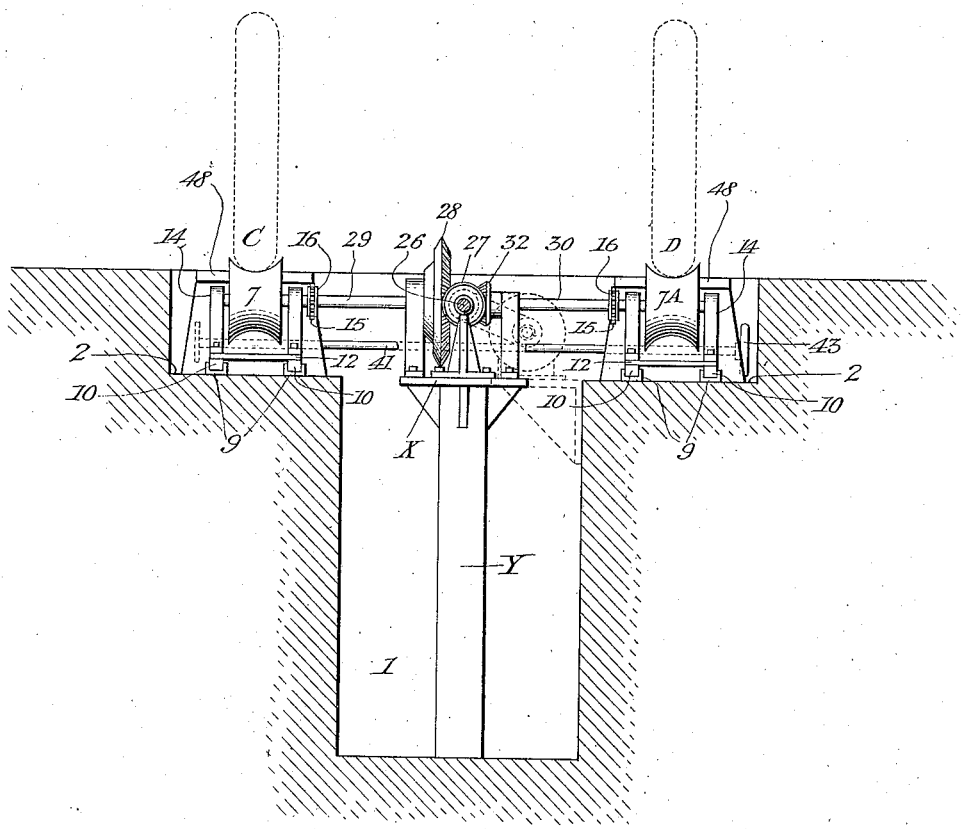

Patented May 15, 1928.

1,669,584

UNITED STATES PATENT OFFICE.

DON Q. WILKES, OF PUEBLO, COLORADO.

BRAKE-TESTING DEVICE FOR AUTOMOBILES.

REISSUED

Application filed November 6, 1926. Serial No. 146,713.

This invention relates to improvements in brake testing devices for automobiles.

The primary object of the invention is to provide a device of this character which is adapted for testing the brakes of cars equipped with either the two-wheel or four-wheel brake system, the brakes, in either case being tested simultaneously, the brake pressure of each wheel being shown by an individual indicator.

Further, to provide a brake testing device comprising sets of grooved rollers arranged to support the four wheels of an automobile and adapted for automobiles of different wheel base lengths, each set of rollers comprising two idlers and a central power driven roller, the idlers having a sprocket and chain connection, the central rollers of the opposite sets being driven by a common differential gearing, whereby a slowing down of any one of said driven rollers is permitted, independently of the other rollers due to increased brake pressure on any one of the automobile wheels, an idler of each set being connected with an independent indicator, thereby to indicate the brake resistance of each wheel.

Further, to provide a brake testing device of this character in which the power driven rollers of each set of wheel supporting rollers are mounted in fixed bearings, while the two idlers of each set are mounted in bearings secured upon adjustable supports, whereby the two idlers of each set can be adjusted with respect to the adjacent power driven roller, thereby to accommodate automobile wheels of different diameters, as well as to provide for slight variations in the wheel base length, each wheel being supported upon a power driven roller and one of the cooperating idle rollers.

These and other objects to be hereinafter set forth, are accomplished by the device illustrated in the accompanying drawings in which:

Figure 3 is a vertical transverse sectional view on the line 3—3 of Fig. 1.

Figure 1:
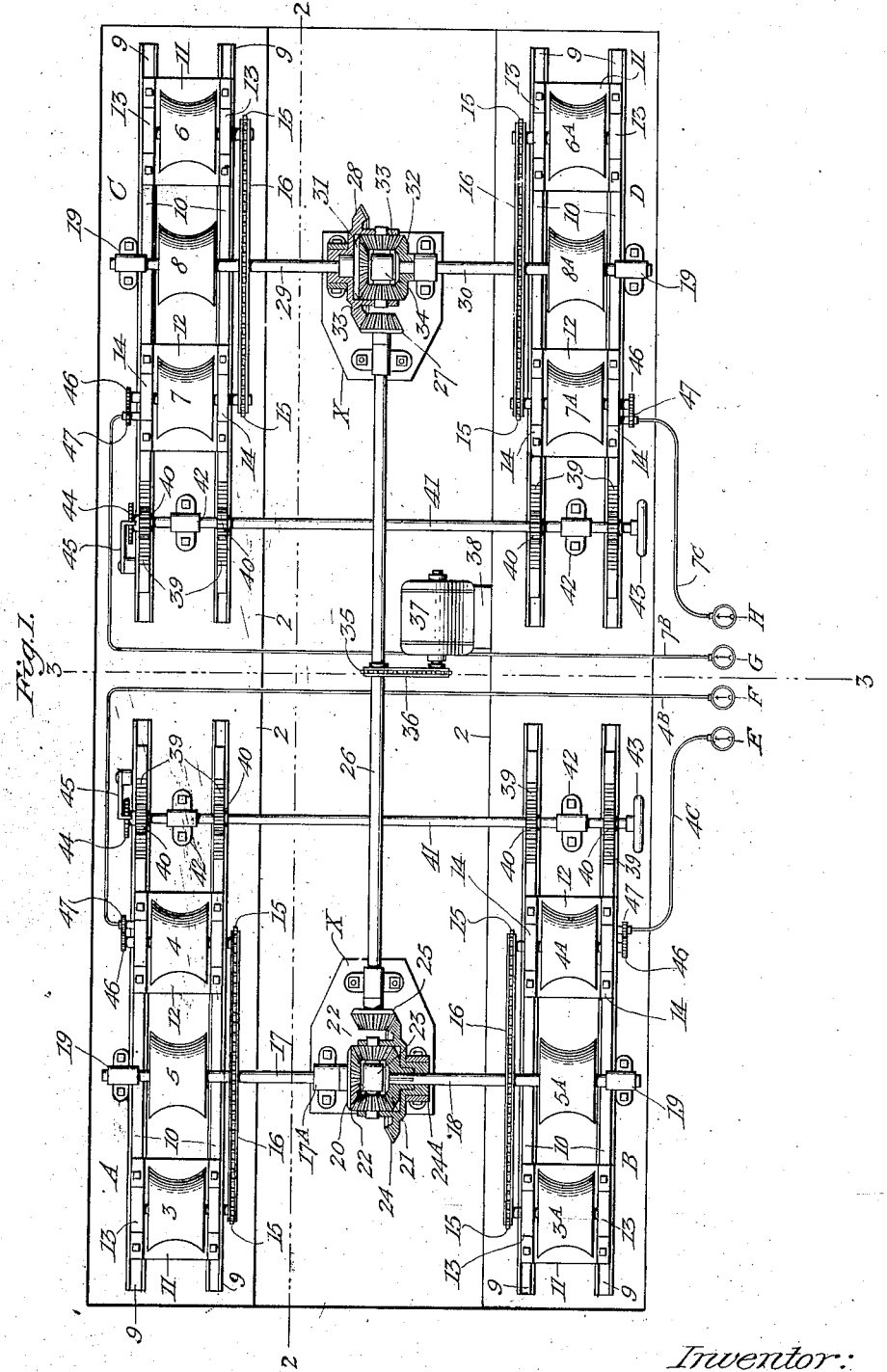
Figure 1 is a plan view of the improved brake testing device, the tracks or bridges between the front and rear sets of rollers on each side being removed for clearer illustration.

In the practical operation of the improved brake testing device, a pit is provided in the floor of a garage or other suitable place, and the car supporting and brake testing rollers are mounted in the pit and on a level with the surface of the floor, so that an automobile can pass from the floor onto the rollers in brake testing position; the pit enabling a workman to pass back and forth beneath the car, in making necessary brake adjustments, as will be understood.

Referring to the accompanying drawings:—

The numeral 1, indicates a pit of suitable length and depth, which is formed on opposite sides and near the top thereof with horizontal ledges 2, upon which are mounted four sets of grooved rollers A, B, C, and D, the sets A and C being on one ledge and the sets B and D, being on the other ledge. Each set comprises a pair of idle rollers and a power driven roller which is located between the idle roller, as will now be particularly described.

The sets A and B, which are oppositely disposed, comprise idle rollers 3—4 and $3^A$—$4^A$ and power driven rollers 5 and $5^A$ and the sets C and D which are oppositely disposed comprise idle rollers 6—7 and $6^A$—$7^A$ and power driven rollers 8 and $8^A$. The rollers of these sets are supported and arranged in the following manner:— Upon the ledges 2, are secured parallel slideways 9, which may be of any suitable character, but as shown, are in the form of channel irons, which are arranged in four pairs, one pair for each set of rollers, and as the four pairs of slideways and cooperating parts are of like construction and arrangement, a description of one pair will suffice. Within each channel 9, is silably mounted a bar 10, and these bars are connected at their outer ends by a horizontal plate 11, and at an intermediate point, by a similar plate 12.

Thus connected, the bars 10 can be slid in unison in a manner to be hereinafter described. Upon the plates 11 and 12, are bolted standards 13 and 14 respectively, and in the upper ends of these standards are mounted the pairs of idle rollers 3—4 of set A and $3^A$—$4^A$ of set B, and 6—7 of set C and $6^A$—$7^A$ of set D. The inner ends of the idle roller shafts are each provided with a sprocket wheel 15, and the sprocket wheels of each pair of rollers 3—4 and 3ᴬ—4ᴬ and 6—7 and 6ᴬ—7ᴬ are connected by sprocket chains 16, so that the idle rollers of each pair will rotate in unison and at the same speed. Between each pair of idle rollers 3—4 and 3ᴬ—4ᴬ are mounted power driven rollers 5 and 5ᴬ respectively, and between each pair of idle rollers 6—7 and 6ᴬ—7ᴬ are mounted power driven rollers 8 and 8ᴬ respectively. The rollers 5 and 5ᴬ which are in axial line are rigidly secured upon the outer end portions of shafts 17 and 18 respectively, the outer ends of which are supported in fixed bearings 19, which are secured upon the ledges 2, and upon the inner ends of these shafts are secured bevel gears 20 and 21 respectively, which mesh with differential pinions 22, on a spider 23, which is supported and rotated by a driving gear 24. The inner end of the shaft 17 is mounted in a standard 17ᴬ on a base plate X which is supported on an upright Y in the pit 1, or in any other suitable manner.

The inner end of the shaft 18 is mounted in the hub of the driving gear 24, which in turn is mounted on a standard 24ᴬ on the base plate X. The driving gear 24, is operated by a driving pinion 25 on the adjacent end of a drive shaft 26, the opposite end of which carries a driving pinion 27 which meshes with a driving gear 28, mounted in a standard 28ᴬ on a base plate X which is also supported on an upright Y in the pit 1.

The power driven rollers 8 and 8ᴬ are secured upon the outer end portions of shafts 29 and 30 respectively, the outer ends of which are mounted in standards 19 on the ledges 2, and upon the inner ends of these shafts, are secured bevel gears 31 and 32, respectively, which mesh with differential pinions 33, on a spider 34, which is supported and rotated by the driving gear 28. The drive shaft 26, carries a sprocket wheel 35 which is connected by a chain 36, with a sprocket wheel on the shaft of a motor 37, which is supported on a bracket 38, secured to one side of the pit. The inner end portions of each pair of slide bars 10, are provided with rack teeth 39, which mesh with pinions 40, on shafts 41 which are mounted in bearing standards 42, supported on the ledges 2. There are two of these shafts 41, one for the slide bars of the roller sets A and B, and one for the roller sets C and D, and each shaft carries two pairs of pinions 40, as plainly shown in Fig. 1.

One end of each shaft 41 is provided with a hand wheel 43, and their opposite ends are provided with toothed disks 44, which are adapted to be engaged by pivoted dogs 45.

By turning the shafts 41, the slide bars 10 may be moved either to the right or left, to vary the positions of the pairs of idle rollers with respect to their respective driven rollers, and any adjustment of these slide bars is maintained by the engagement of the dogs 45 with the toothed disks 44.

The outer ends of the rollers 4, 4ᴬ, 7 and 7ᴬ are provided with small gears 46, which mesh with smaller gears 47, which are mounted respectively on the sides of the adjacent standards 14, and the gears 47 are connected respectively by flexible shafts 4ᴮ, 4ᶜ, 7ᴮ and 7ᶜ, with suitable indicators E, F, G and H, which register the pressure applied by each of the brakes.

In order that all of the wheels of a car may rest upon the supporting rollers, as in the case of cars having the four-wheel brake system, it is necessary to bridge the space between the sets of rollers A and C, on one side of the pit and B and D on the other side of the pit, so that a car can pass onto the rollers at one end of the pit and thence to the rollers at the other end of the pit; and while this may be accomplished in any suitable way, I preferably employ two tracks or bridges 48, which are supported on the ledge 2 and which are of any suitable construction. This arrangement does not interfere with the movements of a workman in the pit or with the head room under the car.

Figure 2:
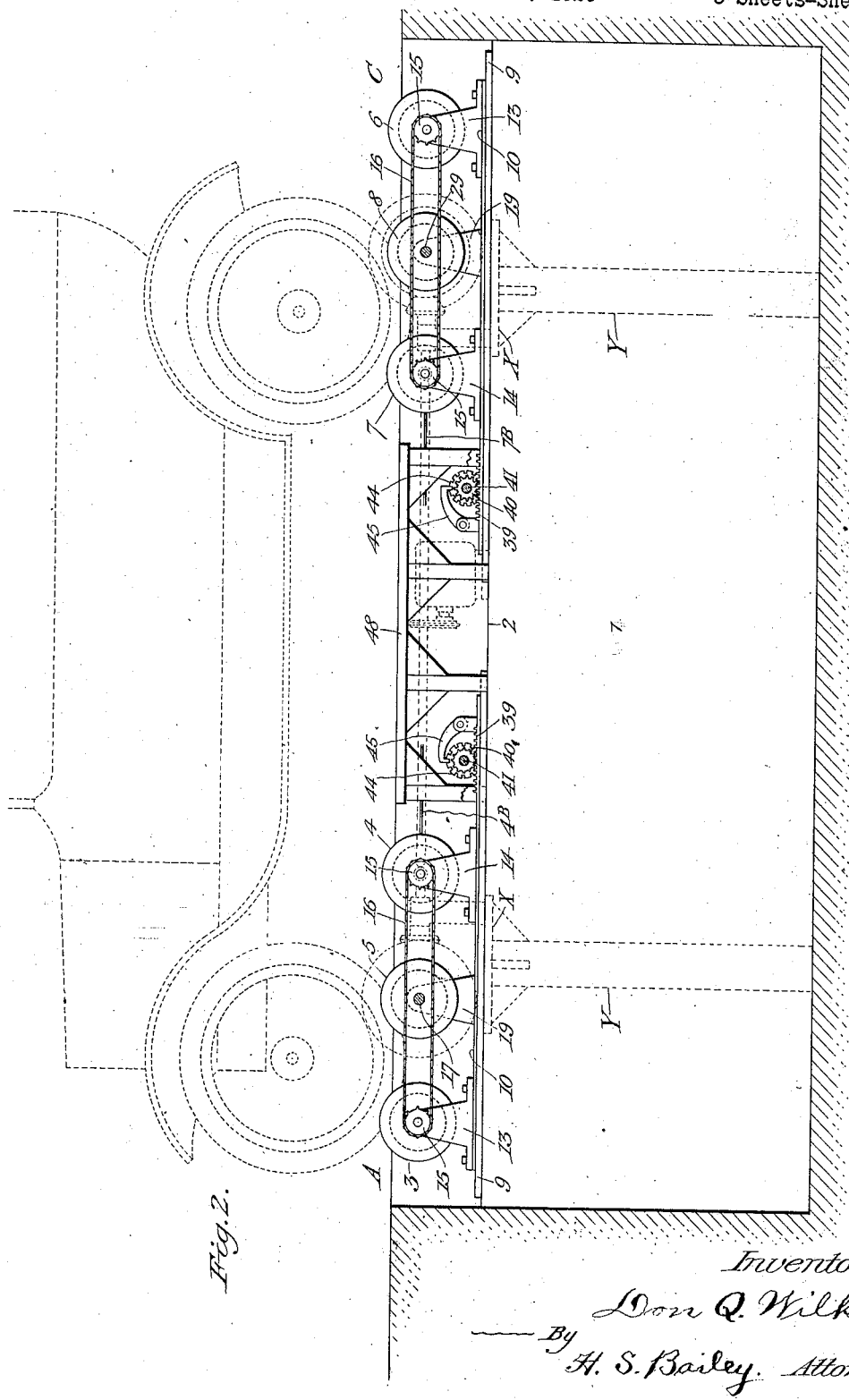
Figure 2 is a vertical longitudinal sectional view on the line 2—2 of Fig. 1.

In practice, when it is desired to test the brakes of a car having the four-wheel brakes system, the car is driven or backed on to the rollers, so that each wheel will rest partly on an idle roller and partly on a driven roller, as shown in Fig. 2. If the car has a very long wheel base, its wheels can be supported on the outer idle roller of each pair and the driven rollers, and if the car has a short wheel base, one pair of wheels may rest on the outer idle rollers and the adjacent driven rollers at one end of the pit and the other pair of wheels will rest on the inner pair of idle rollers and the driven rollers at the other end of the pit as indicated by the car in dotted lines shown in Fig. 2, and to accommodate any variations between long and short wheel bases, the idle rollers, may be adjusted with respect to the driven rollers, so as to properly support all four wheels of the car, in the manner previously described. Power is then applied to the rollers 5—5ᴬ and 8—8ᴬ through the driving shaft 26 and the two sets of differential gearing operated thereby, and the wheels of the automobile are thereby driven simultaneously at a uniform rate of speed, and this speed is transmitted to the idle roller of each pair upon which a car wheel rests and also to the other idle wheel of each pair through the sprocket chains 16 which connect the idle rollers of each pair, each idler being thus compelled to travel at the same peripheral speed as the wheel which drives it.

The speeds of the idlers are registered automatically on the indicators E, F, G and H, and if no influences are exerted, other than the turning force of the drive rollers 5—5ᴬ and 8—8ᴬ, the indicators for the four car wheels will register the same speed. But when the brakes are applied to the four wheels there is an immediate slowing down of the wheels in proportion to the effectiveness of the brakes, and this slowing down of the speed of the wheels instantly affects the idle wheels in the same manner as the automobile wheels which drive them. The rear brakes should each apply thirty percent of the entire brake pressure and the front brakes should each apply twenty percent of the entire pressure, and if the brakes are not properly adjusted, any variation in this percentage will be registered by the indicators, and the brakes can then be adjusted and tested until the desired results are obtained. The differential gearing permits any one of the driven rollers 5—5ᴬ, 8—8ᴬ to slow down under increased resistance, independently of the others, so that the exact pressure applied by each brake can be correctly ascertained and recorded.

In cases where the wheel base is of such length that all four brakes can not be tested simultaneously, the same results can be obtained by testing the front and rear brakes separately, and in testing two wheel brakes, it is only necessary to back the rear wheels of the car upon the testing rollers.

Having described my invention what I claim as new and desire to secure by Letters Patent, is:—

1. In a brake testing device of the character described, the combination with opposite sets of three rollers for supporting the wheels of an automobile of power driven gearing for driving the middle rollers of said sets in common, and for permitting a slowing down of either of said driven rollers independently of the other under increased resistance, means for connecting the other two rollers of each set to rotate in unison, and means for indicating the speed for each of said middle driven rollers.

2. In a brake testing device of the character described, the combination with oppositely positioned rollers and means for driving both rollers in common and for permitting a slowing down of either roller independently of the other under increased resistance; of idle rollers on opposite sides of each power driven roller, either roller of each pair of idle rollers, providing in connection with the power driven rollers, supports for the opposite wheels of an automobile, means for connecting the idle rollers of each pair to rotate in unison and at the same speed, and a speed indicator connected with one of the idle rollers of each pair.

3. In a brake testing device of the character described, the combination with opposite sets of three rollers for supporting opposite wheels of an automobile; of alined shafts for the middle rollers of the sets having bevel gears on their inner ends, power driven differential gearing connected with said bevel gears for rotating said shafts in common and permitting a slowing down of either shaft independently of the other, a chain and sprocket connection for the other two rollers of each set, and a speed indicator connected with one of the latter rollers of each set.

4. In a brake testing device of the character described, the combination with opposite rollers; and means for driving both rollers in common and for permitting a slowing down of either roller independently of the other under increased resistance; of idle rollers on opposite sides of each power driven roller, either roller of each pair of idle rollers providing in connection with the power driven rollers, supports for the opposite wheels of an automobile, means for connecting the idle rollers of each pair to run in unison and at the same speed, means for varying the position of the idle rollers with respect to the driven rollers, and a speed indicator connected with one of the idle rollers of each pair.

5. In a brake testing device of the character described, the combination with opposite pairs of idle rollers and bearings therefor, means for connecting the rollers of each pair to rotate in unison, a roller between each two idle rollers and means for rotating the middle rollers in common and for permitting them to rotate at different speeds; said middle rollers having fixed bearings; of slidable supports for the idle roller bearings, means for adjusting said supports to vary the positions of the idle rollers with respect to the driven rollers, and an indicator connected with one of the idle rollers of each pair.

6. In a brake testing device of the character described, pairs of axially alined idle rollers, chain and sprocket connections between the rollers of each pair, a roller between each pair of idle rollers each of which acts in connection with the rollers on either side thereof to support one of the wheels of an automobile, means for driving the middle rollers in common and for permitting them to rotate at different speeds, means for varying the position of each pair of idle rollers with respect to the driven roller, and a speed indicator connected with one of the idle rollers of each pair.

7. In a brake testing device of the character described, the combination with opposite pairs of idle rollers; means for connecting the rollers of each pair to rotate in unison, a roller between each pair of idle rollers, each of which acts in connection with the roller on either side thereof to support one of the wheels of an automobile and means for driving the middle rollers in common and for permitting them to rotate at different speeds; of means for adjusting the position of each pair of idle rollers with respect to the middle roller, means for maintaining said pairs of rollers in adjusted positions, and an indicator connected to one of the idle rollers of each pair.

8. In a brake testing device of the character described, the combination with opposite slidable supports, means for adjusting said supports in unison and means for locking said supports in adjusted positions; of pairs of standards on said supports, idle rollers mounted in said standards, means connecting the rollers of each pair to rotate in unison, a middle roller between each pair of said idle rollers, fixed bearings for said middle rollers each of said middle rollers acting in connection with the roller on either side thereof to support one of the wheels of an automobile, means for driving the middle rollers in common and for permitting them to rotate at different speeds, and an indicator connected to one of the idle rollers of each pair.

9. In a brake testing device of the character described, the combination with opposite slidable supports having rack teeth, a manually operated shaft having pinions which engage said rack teeth to move said supports in unison, a toothed disk on said shaft and a dog to engage said tooth disk to lock said shaft and hold said supports in adjusted positions; of pairs of bearings on said supports, idle rollers mounted in said bearings, means connecting the rollers of said pair to rotate in unison a middle roller between each pair of idle rollers, shafts for said middle rollers, fixed bearings for said shafts, power operated differential gearing connected with said shafts, and an indicator connected to one of the idle rollers of each pair.

In testimony whereof, I affix my signature.

DON Q. WILKES.